April 19, 1932.  W. A. RANKIN  1,854,224
WAFFLE
Filed Jan. 24, 1929
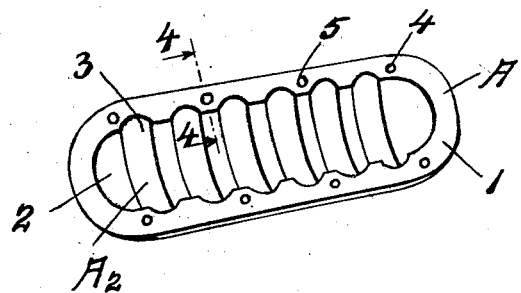
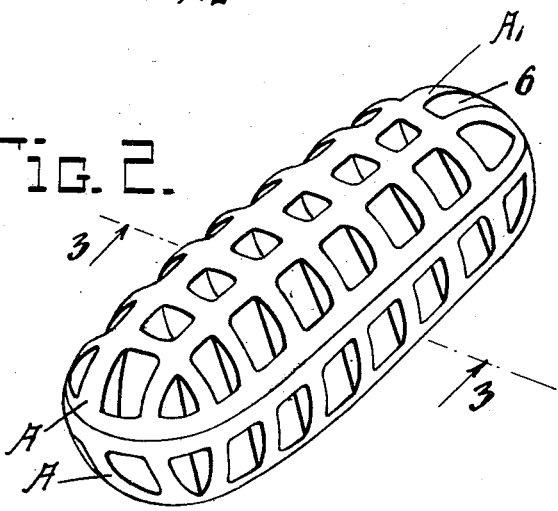
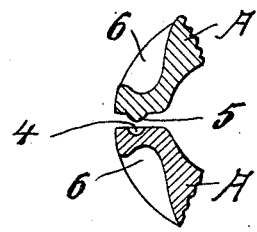
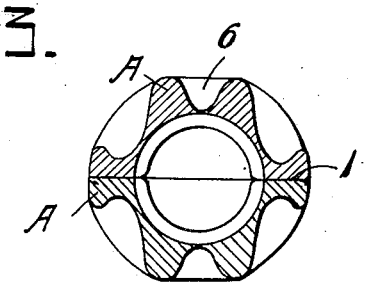
Inventor
W. A. Rankin.
By *Robert Robb*
Attorneys Patented Apr. 19, 1932

1,854,224

UNITED STATES PATENT OFFICE

WILLIAM A. RANKIN, OF TOLEDO, OHIO, ASSIGNOR TO THE SWARTZBAUGH MANUFACTURING COMPANY, OF TOLEDO, OHIO, A CORPORATION

WAFFLE

Application filed January 24, 1929. Serial No. 334,713.

This invention has for its principal object, the provision of a novel type of waffle, and which waffle, due to its shape and construction, will have several inherent advantages over any known similar pastry. A waffle is characterized by the fact that it is baked in a waffle iron and results from the baking of a batter in the iron. Such a process of cooking the pastry is desirable not only because it provides a very tasty product, but also in view of the fact that just as many waffles may be cooked at any one time as will be necessary, and may be prepared in an extremely small space of time. As my novel type of waffle is designed primarily for commercial use although it might well be used in the home, it is to be distinguished from the so-called patties which are now baked in ovens from a dough, in that a waffle is a batter product.

A waffle made in accordance with my invention is characterized mainly by the fact that it is formed with a cavity or recess in one face thereof. This cavity is designed to hold foodstuffs in a manner well known in the culinary art. To the end of insuring the thorough cooking of the waffle in a very short amount of time which is so essential from commercial aspects, the main body portion of the waffle defining the cavity is further provided with grooves so that none of the batter making up the waffle will be so far away from the baking metal of the iron that it will not be thoroughly cooked. With this same object in view the outer surface of the waffle is formed with a plurality of depressions which are always identified with the waffle.

A further object in view is to provide a waffle of the type hereinbefore described which is designed to cooperate with a similar or rather complemental waffle to provide a two-part waffle formed with a recess which is intended to receive a wiener. In view of this thought, the outer surface of the waffle is rounded, which feature not only provides a product more easily handled, but also allows for the ready removal of the waffle from the mold in which it is cooked. In this connection, it might be well to mention that a waffle such as provided by my invention may be cooked in a waffle mold such as disclosed and described in my co-pending application, Serial Number, 334,712 of even date herewith.

Bearing in mind the two complemental waffles are designed to make a complete jacket for a sausage, it is an object of the invention to provide interlocking means for preventing relative sliding movement between the waffle parts. In carrying this idea out more in detail, each waffle is formed with lugs and recesses which interlock with similar lugs and recesses on the other waffle when the two are properly mated.

With these and other objects in view as will in part become apparent and in part be hereinafter stated, the invention comprises certain novel constructions and combinations of parts as will be subsequently specified and claimed.

For a full and more complete understanding of the invention, reference may be had to the following description and accompanying drawings, wherein Figure 1 is a view in perspective of a waffle made in accordance with the invention, the view being taken to more clearly bring out the recess in the waffle.

Figure 2 is a perspective showing of two waffles used in combination to form a jacket for a wiener or similar food.

Figure 3 is a sectional view taken about on the line 3—3 of Figure 2 showing the thin walls of the waffle and the cavity therein, thereby providing room for a sausage, and Figure 4 is a fragmentary showing in section bringing out the interlocking of the complemental lugs and recesses.

While a preferred specific embodiment of the invention is herein set forth, it is to be understood I am not to be limited to the exact construction illustrated and described because various modifications of these details may be provided in putting the invention into practice within the purview of the appended claims.

A waffle is shown in Figure 1 and designated generally by the reference character A. This waffle is of a substantially oval formation, having a flat side which is provided with a recess 2 that conforms generally with the oval formation of the waffle. In the present instance the waffle A is shown as somewhat (slightly) longer in one direction than in the other. This is due to the fact that it is designed primarily to function as a jacket for a wiener. It is to be understood, however, that I am not to be limited to the particular proportions of the waffle shown in the drawings.

It is noted that the waffle A has an outer convex surface designated A1, and an inner concave surface A2. The concave surface A2 is provided with grooves 3 so that none of the material of the waffle will be spaced so far from the cooking metal of the waffle iron that it will not be cooked in a very short space of time.

The flat side 1 of the waffle is formed with lugs 5 and recesses 4 and which lugs and recesses are adapted to interlock with similar lugs and recesses on another complemental waffle whereby two of the waffles A will be held in the position shown in Figure 2 wherein they constitute a jacket for a wiener if it is so desired.

The outer or convex surface A1 is provided with the recesses 6 in the usual manner, as these recesses which are formed by projections on the iron insure the proper cooking of the batter to form the cooked product.

It is apparent from the foregoing that I have provided waffle parts, two of which may be used to form a jacket for a wiener. However, it is obvious that one of the waffles may be used individually as a holder for foodstuffs much in the same manner as patties are used today.

The depressions or grooves 3 hereinbefore referred to constitute a highly desirable feature of the invention. When a pair of waffles are being used as a jacket for a sausage they provide a space accommodating any dressing or relish which may be added by way of supplement to the sausage. This arrangement obviates such undesirable conditions as the squeezing out of mustard while a person is eating a hot dog. It is further noted that if a single waffle is being eaten "out of hand" the grooves act as sort of retaining means for any syrup, honey or like flavoring material which may be added. I have employed a construction of waffle characterizing these grooves rather than the usual depressions because the grooves seem to lend themselves better to the removal of the waffle from the mold.

When one of my novel waffles is served in the usual way, the concave side may be disposed next to the serving plate. Under these conditions the depressions 3 will catch and hold any syrup or other dressing which may be added. When the waffle is being served in this manner the cavity 2 may be filled with cheese or any other food material. The novel shape of the waffle provides for the retaining of its heat by the same longer than has been customary with the old types of waffles. This is due to the fact that not as much of the waffle comes in contact with the relatively cold serving plate, hence moisture condensing is also eliminated.

Having thus described my invention, what I claim as new and desire to secure by Letters Patent of the United States, is:

1. A waffle comprising a body portion having convex and concave surfaces, the surfaces being formed with depressions therein, and comprising separate halves of the body portion, the surfaces giving an oval configuration to the waffle when properly joined together, each of the halves being formed with a recess conforming with the configuration of the surface to provide a hollow cavity within the waffle adapted for the reception of foodstuffs therein, and cooperating lugs on each half of the waffle to prevent relative slipping thereof when the halves are joined together.

2. A waffle comprising a body portion formed of two separate parts, each part having convex and concave surfaces formed with depressions therein, the parts giving an oval configuration to the waffle when properly joined together, each of the parts being formed with a recess therein conforming with the configuration of the surface to provide a hollow cavity within the waffle adapted for the reception of foodstuffs therein, each of the parts being also provided with complemental lugs and recesses, the lugs and recesses of one of the parts interlocking with those of the other to inhibit relative movement between the parts when placed together.

In testimony whereof I affix my signature.

WILLIAM A. RANKIN.